United States Patent

Fussell

[15] 3,659,208
[45] Apr. 25, 1972

[54] SENSITIVE THRESHOLD OVER-THE-PEAK SIGNAL DETECTION SIGNALS

[72] Inventor: Richard L. Fussell, Chester Springs, Pa.
[73] Assignee: Burroughs Corporation, Detroit, Mich.
[22] Filed: Aug. 31, 1970
[21] Appl. No.: 68,177

[52] U.S. Cl..............................328/31, 307/232, 307/235, 307/261, 307/291, 328/110, 328/151
[51] Int. Cl....................................H03k 5/153, H03k 17/30
[58] Field of Search..................307/232, 235, 247, 260, 261, 307/264; 328/31, 60, 61, 109, 110, 115, 116, 117, 132, 150, 151

[56] References Cited

UNITED STATES PATENTS

| | | | |
|---|---|---|---|
| 3,278,851 | 10/1966 | Damon, Jr. et al.................307/235 X |
| 3,375,450 | 3/1968 | Ayres et al.............................328/150 |
| 3,437,834 | 4/1969 | Schwartz............................328/150 X |
| 3,489,921 | 1/1970 | Mietz....................................307/235 |
| 3,524,994 | 8/1970 | Ritter....................................307/235 |
| 3,546,482 | 12/1970 | Bader et al..........................328/150 X |
| 3,553,595 | 1/1971 | Walsh...................................328/151 |

Primary Examiner—Donald D. Forrer
Assistant Examiner—L. N. Anagnos
Attorney—Charles S. Hall, Paul W. Fish and Edward J. Feeney, Jr.

[57] ABSTRACT

Threshold and over-the-peak detector circuits are disclosed which in a system configuration provide an interface between input low amplitude analog signals and digital decision logic. The circuits provide threshold information to the decision logic for initiating signal analysis processing at a suitable time prior to the occurrence of the signal peak. Over-the-peak output signals are generated by the system only when predetermined characteristics of the analog signals have been validated.

9 Claims, 8 Drawing Figures

INVENTOR.
RICHARD L. FUSSELL
BY
Francis A. Varallo
AGENT

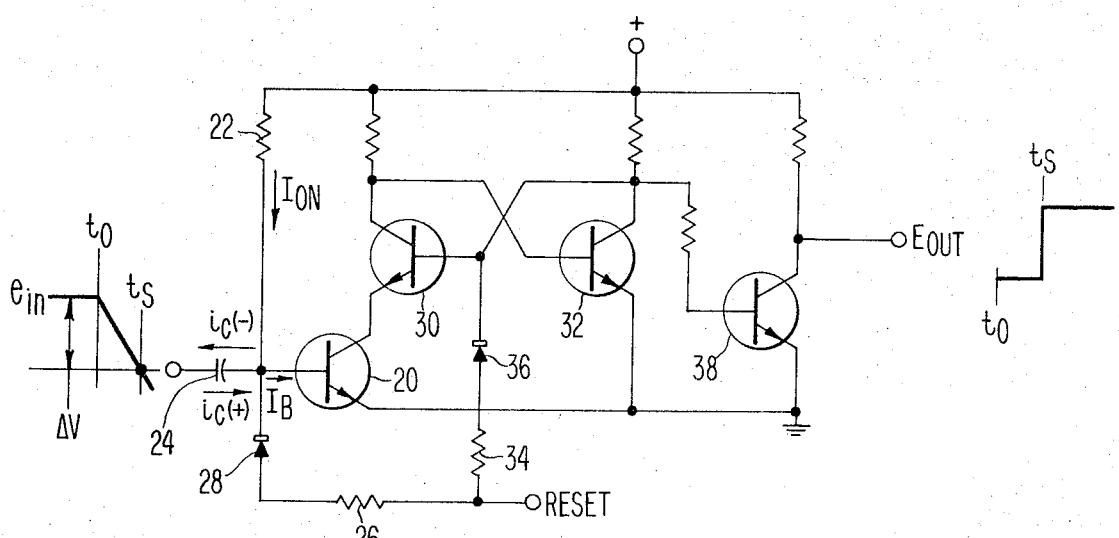
_Fig.4_
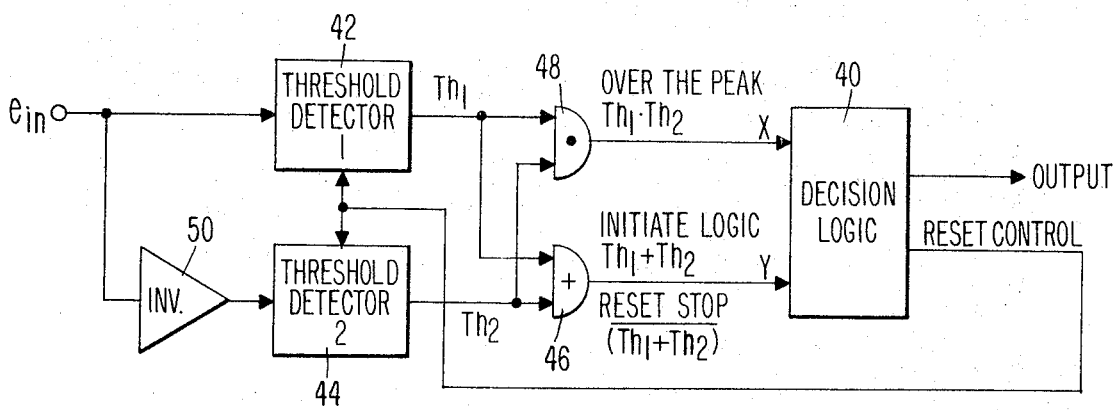
_Fig.5_
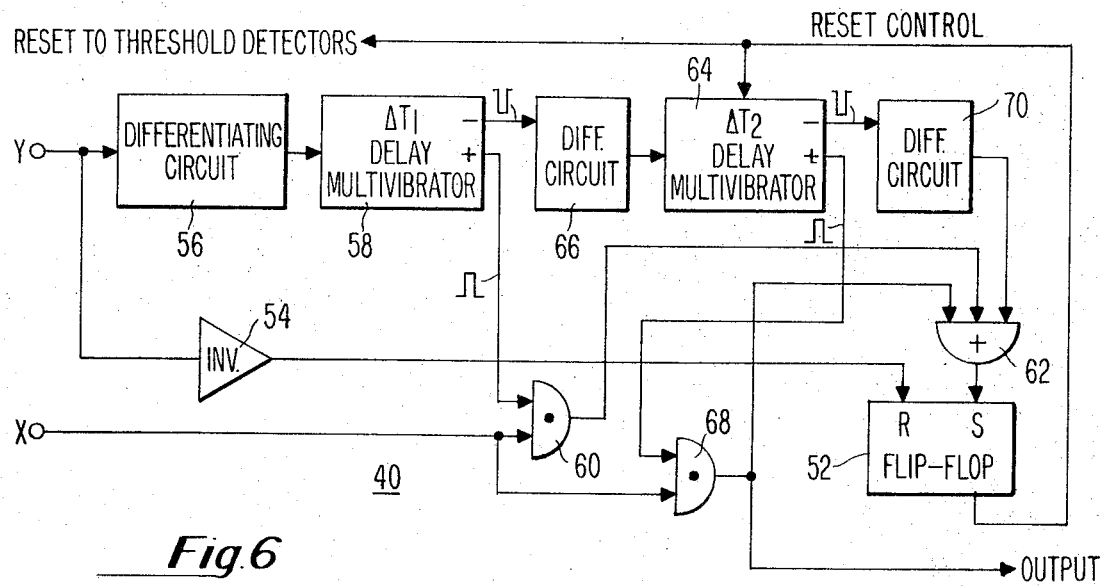
_Fig.6_

SENSITIVE THRESHOLD OVER-THE-PEAK SIGNAL DETECTION SIGNALS

CROSS REFERENCE TO RELATED APPLICATION

The basic circuit element, a threshold switch, employed in the present invention is described and claimed in application Ser. No. 679,965, now U. S. Pat. No. 3,546,482, "Signal Peak Detection System," by Clifford J. Bader and Richard L. Fussell. This application is assigned to the same assignee as the present application.

BACKGROUND OF THE INVENTION

The invention herein described was made in the course of, or under a contract with the Department of the Navy.

As taught and claimed in the reference application, this signal peak detection system comprised of a plurality of threshold switches provides an output level transition when the absolute amplitude of the input signal information begins to decline after passing through a maximum level. The referenced system is characterized by high sensitivity, self-adjustment of operating conditions, wide temperature and supply voltage tolerance and low power requirements. As such it is admirably suited for a variety of applications. However, in some applications, it has been found desirable to validate the input signal characteristics as a condition for generating an over-the-peak output indication. The reference system as described does not exhibit such a capability.

In accordance with the present invention, circuits and techniques are provided which considerably extend and expand the detector system of the reference application. The systems described and claimed herein provide an optimum hardware and functional interface between low level, long period analog circuits and digital decision logic, thereby performing sensitive analog-to-digital conversion. Moreover both initial and final information is applied to the decision logic. The former effects signal analysis processing at an appropriate time before the signal peak occurs and the latter indicates a return to the analog steady state condition where no input signal is present. The systems described herein have the capability of limiting the number of decision logic "start processing" signals to those which have a high probability of satisfying peak detection conditions. Also, the systems provide a direct information constraint to the decision logic that the input signal possesses invalid characteristics. The "digital" signal applied to the decision logic is designed to have a fast rise and fall characteristic with minimum noise content, although the analog signal may be extremely slow and incorporate significant electrical noise.

Other features of the present invention include symmetrical performance with respect to the applied analog signal; minimum dependence on semiconductor critical device parameters; and low voltage, low current operation.

SUMMARY OF THE INVENTION

In accordance with one embodiment of the present invention, an electrical signal is applied both in-phase and phase-inverted to the respective input terminals of a pair of current amplifying stages which serve as threshold switches. The outputs of these stages are subjected to both an AND and an OR gating function. Both stages are initially in a conducting state in the absence of an input signal.

An applied signal of suitable amplitude causes a first threshold switching in which one of the stages is driven to nonconduction. This condition produces an initiate logic signal from the OR gate. A second threshold switching occurs as the analog signal begins to decline after passing through its peak, and the other stage is likewise driven to nonconduction. The coincidence of output voltage levels from the two nonconducting stages effects an output from the AND gate, signifying the occurrence of the over-the-peak condition. A second embodiment of the invention especially useful in high sensitivity systems utilizes the basic threshold switches in combination with a full latch to provide a storage action. The latter, which may be implemented by a cross-coupled flip-flop, provides advantages over the previously mentioned embodiment and these will become apparent in the detailed description of the invention which follows.

BRIEF DESCRIPTION OF THE DRAWING

FIG. 4 is a schematic of a full-latch threshold detector device.

FIG. 5 is a block diagram of a system configuration utilizing a pair of the threshold devices depicted in FIG. 4.

FIG. 6 is a logic diagram suitable for use in providing the "-decision logic" for the system of FIG. 5.

DESCRIPTION OF THE PREFERRED EMBODIMENTS

Figure 1:
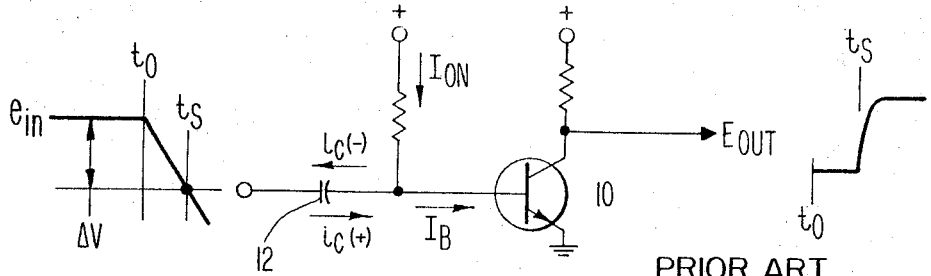
FIG. 1 is a schematic diagram of the basic threshold switch common to the present and the reference application.

The basic circuit element, the threshold switch, depicted in FIG. 1 is utilized in the present invention as well as that of the reference application. The circuit provides the capability of generating switching signals at very low analog signal amplitudes, for example, less than 10 millivolts peak, and very low frequencies, less than 0.1hz. The current consumed by the basic switch is less than 5 microamperes. Although the operation of the basic switch has been described in detail in the referenced application, it is believed helpful at this time to review its characteristics.

With reference to FIG. 1, the switching transistor 10 is normally in a conducting state in the absence of an applied analog signal $e_{in}$ as a result of a small dc bias current $I_{ON}$. The analog signal of interest is coupled to transistor 10 by way of an appropriate capacitor 12 and hence in the steady state prior to time $t_0$ results in no additional current contribution. That is, the capacitor current $i_c = 0$ where $dv/dt$ of the input signal is also equal to zero. The capacitive coupling also permits a generous tolerance for analog steady state voltage conditions over a wide dc dynamic range. At time $t_0$, the input voltage starts to go negative. The switching of transistor 10 occurs only when the analog signal begins to develop a sufficiently negative $dv/dt$. Under these conditions capacitive current, $i_c(-) = -C \, dv/dt$ occurs and since the capacitive current is greater than the bias current $I_{ON}$ the transistor conduction can no longer be sustained and switching commences at time $t_S$. The output $E_{out}$ of the threshold switch is developed on the collector electrode of transistor 10. A knowledge of the transistor parameters defines a predictable switching point since the device will not turn off instantaneously when the base current $I_B$ becomes zero. This fact is illustrated in FIG. 1 by the negative ramp of the input signal transition voltage $\Delta V$, which results in a transistor base voltage change, $-\Delta V_{BE}$, in addition to a base current change. As a result, the precise switching conditions are $$\frac{de_{in}}{dt} \geq \frac{I_{ON}}{C}$$

and $$-\Delta V \geq V_{BE(Sw)}$$

where $V_{BE(Sw)}$ is the required device transition voltage for immediate switching. Control of the device base transition voltage requirement is best achieved by specifying the transistor collector-to-emitter saturation voltage which is a readily measurable and process-controllable parameter.

It should be noted that for an applied signal positive slope the capacitor current $i_c(+) = +C \, dv/dt$ merely adds to the bias current $I_{ON}$ thereby increasing the transistor base current and maintaining the transistor in a conducting state. It is therefore apparent that the basic circuit of FIG. 1 is substantially unresponsive to positive-going input signals.

Figure 2:
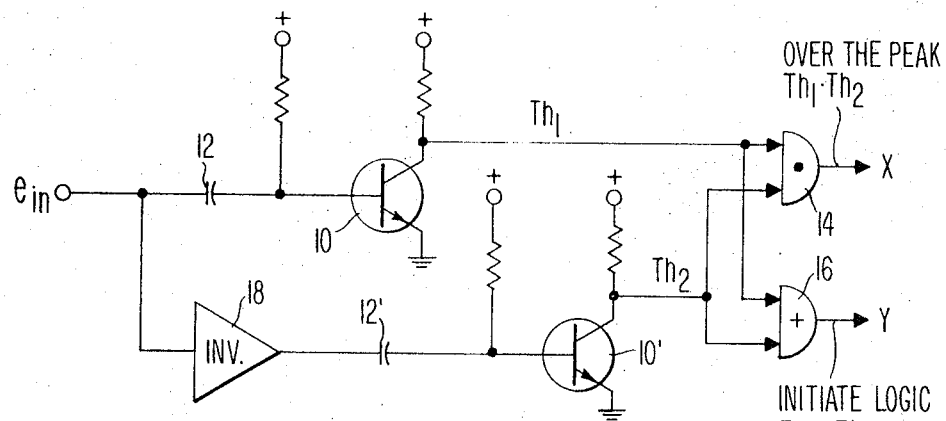
FIG. 2 is a schematic representation of a detector system utilizing the basic switch of FIG. 1 and providing logic initiation.

FIG. 2 illustrates a system configuration utilizing the basic threshold switch of FIG. 1 and providing an over-the-peak output indication as well as a logic initiation signal. The system utilizes a pair of identical threshold switches and an analog signal inverter in addition to the AND ($\cdot$) and OR (+) gating functions. It should be understood that if the source itself of the input analog signal provides the push-pull drive required by the system, the signal inverter is unnecessary and can be eliminated. If a phase-inverter circuit must be used, numerous varieties of this circuit, well known to those skilled in the electronic art, may be successfully employed. It has been found, for example, that the use of a stabilized, feedback-type, unity gain, inverting amplifier is particularly advantageous because of the inherent low output impedance and stability of such a configuration.

Figure 3:
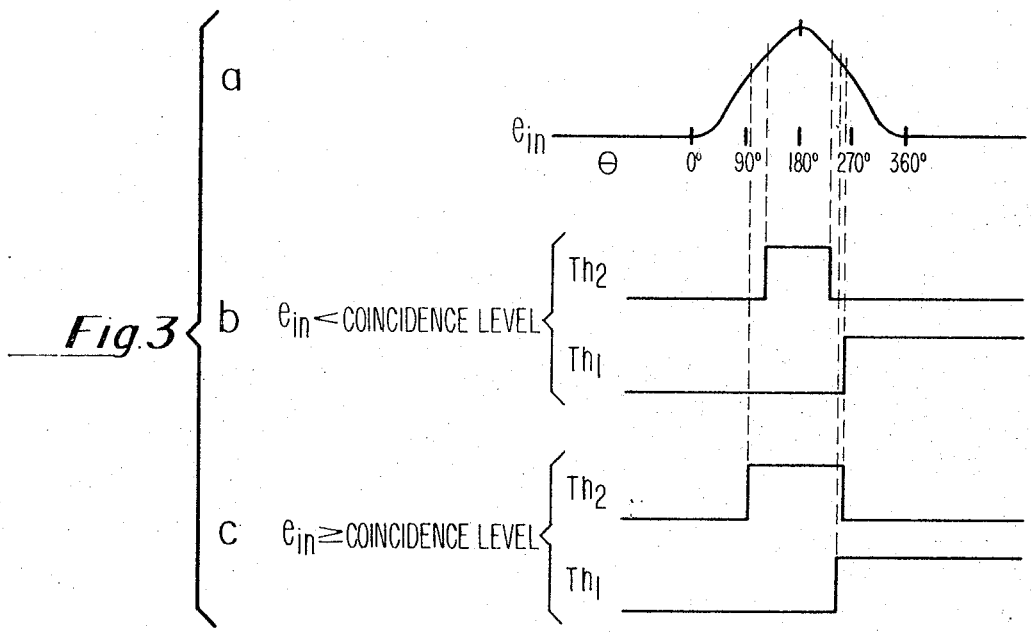
FIG. 3a–3c illustrate the waveforms resulting from the switching action of the threshold detector stages for different input analog signal conditions.

FIGS. 3a–3c illustrate the signal switching conditions which occur in the system configuration of FIG. 2 for a single peak analog signal. FIG. 3a illustrates a typical input signal designated $e_{in}$. The amplitude of the analog signal $e_{in}$ may be specified at any given time with reference to the angle $\theta$ covering 0° to 360°, the entire period of the input signal. The waveforms of FIG. 3b illustrate the switching of a pair of threshold detectors, the outputs being designated $Th_1$ and $Th_2$, for the condition where the amplitude of $e_{in}$ is less than that required to cause coincidence of the threshold switch outputs. The switching waveforms of FIG. 3c illustrate the coincidence of outputs of the threshold switches for an analog signal amplitude of approximately two or three times that assumed in connection with the waveforms of FIG. 3b.

With reference to FIGS. 2 and 3a–3c, the following circuit switching results will occur in the system of FIG. 2 for the analog signal depicted in FIG. 3a. For convenience, the threshold switches will be identified by their outputs, namely $Th_1$ and $Th_2$. For a steady state operation where the input signal angle $\theta$ is less than 0°, both threshold switch transistors 10 and 10' are conducting. $Th_1$ and $Th_2$ the respective outputs of the switches appearing on the collector electrodes of transistors 10 and 10' are substantially at zero level. Likewise, the outputs X and Y of AND ($\cdot$) gate 14 and OR (+) gate 16 are zero.

The first threshold switching occurs when $\theta$ is larger than 0° but less than 180°. Thus, for an applied analog signal as shown in FIG. 3a, with a peak amplitude slightly greater than the threshold switch minimum response level, (that is $dv/dt > I_B/C$, and $-\Delta V > -\Delta V_{BE(Sat)}$) the $Th_2$ switch experiences a negative-going input via capacitor 12' by virtue of inverter 18 in the first 180° of signal $e_{in}$. The $Th_1$ switch experiences a positive-going input applied via capacitor 12. For the amplitude and $dv/dt$ conditions defined, the $Th_2$ device will thus go from a conducting state to a nonconducting state in the region of the signal 90° angle, but the $Th_1$ device will be maintained in a conducting state by the positive $dv/dt$ generated base current. The output result is that logic signal Y occurs, that is $Th_1 + Th_2 = 1$, thereby providing an initiate logic signal. However, no $Th_1$ output, or X logic signal can occur under these conditions.

A second threshold switching occurs when $\theta$ the input signal angle, is greater than 180° and less than 360°. At the signal 180° point, the threshold switch input $dv/dt$ conditions reverse and the $Th_2$ switch experiences a $+dv/dt$ input while the $Th_1$ switch experiences a $-dv/dt$ input. Hence the conditions are established to drive the $Th_1$ device to nonconduction and to return the $Th_2$ device to the conducting state. With the system configuration of FIG. 2 and the analog signal depicted in FIG. 3a, the conditions of FIG. 3b can occur, where the $Th_2$ device recovers, that is returns to the conducting state, before the $Th_1$ threshold switch assumes a nonconducting state. Thus at no time during the input signal period is there coincidence of the $Th_1$ and $Th_2$ outputs, and the X logic signal indicating an over-the-peak detection is not generated. If it is assumed that the analog signal amplitude is considerably larger than that which produced the switching conditions of FIG. 3b, the result shown in FIG. 3c will occur where the $Th_1$ device is switched to a nonconducting state before the $Th_2$ device switches back to a conducting state. This results in a coincidence of signals from the detectors $Th_1$ and $Th_2$ and an X logic signal is produced indicating an over-the-peak condition.

It is apparent from the foregoing switching considerations, that the configuration of FIG. 2, while suitable for many applications, may not possess the sensitivity required in special applications. This condition is reflected in the switching waveforms of FIG. 3b where the negative excursion of the analog signal applied to threshold switch $Th_2$ is not sufficiently great to cause a delay in the recovery or return to conduction of $Th_2$, beyond the 180° point of the input signal. Such delay would have permitted switch $Th_1$ to assume a nonconducting state while $Th_2$ was still nonconducting. Such coincidence of outputs from the two nonconducting switches would have resulted in an X signal indication of an over-the-peak condition, as in the case of FIG. 3c.

In order to overcome the difficulty illustrated in FIG. 3b, a high sensitivity threshold switch of the type illustrated in FIG. 4 may be utilized. This high sensitivity switch employs a unique latching circuit in combination with the basic threshold switch of FIG. 2. A pair of such high sensitivity threshold switches are used in the detector system depicted in FIG. 5, which system provides at least the following specific advantages.

When used in the full system embodiment of FIG. 5, the full latch or storage action results in minimal separation between the validation or decision logic threshold (OR gate) and over-the-peak detection threshold (AND gate) providing improved system immunity to the input signal noise and drift by a factor of 2 or 3 to 1. Additionally, the circuit configuration permits a single polarity reset signal to be used on both the input threshold stage and the latching circuit. Such a configuration also provides a condition that the output will not return to steady state condition until the input threshold stage is fully reset. A minimum number of active and passive components are used in the circuit configuration and very low current operation is achieved. Another feature of the circuit configuration is that improved output switching speeds are achieved and switching chatter on very low $dv/dt$ input signals is eliminated. Another advantage of the circuit configuration is that the sensitivity of the input threshold stage to parameter variations is substantially reduced.

As shown in FIG. 4, the full latch threshold detector first stage 20 is identical to the basic threshold switch previously described. The transistor steady state base bias current $I_B$ is established by resistor 22 and the + supply voltage. The capacitive current $i_c(-)$ and $i_c(+)$ are respectively subtracted from or added to the bias current as a result of the $e_{in}$ analog signal $dv/dt$. The input signal is coupled to the threshold switch via capacitor 24. An addition to the basic stage is the path for reset current by way of resistor 26 and diode 28, such that when the reset control signal is "high," a current designed to be significantly larger than $I_{ON}$ will also flow to the base of transistor 20.

It should be recalled that the basic switch steady state operation is that it is conducting and that the negative-going analog signals switch the stage to a nonconducting state. As a consequence, the presence of additional reset controlled base current will tend to return transistor 20 to its conducting, that is, steady state, condition.

Transistors 30 and 32 of FIG. 4 in combination form a cross-coupled latch or flip-flop wherein the conducting path for the transistor 30, normally conducting in steady state, is controlled by the threshold switch transistor 20, which is also conducting under steady state conditions. Transistor 32 is normally in a nonconducting state.

The circuit reset control signal also applies a current to the base of transistor 30 by way of resistor 34 and diode 36 and it will be observed that a positive reset level results in positive base current flow for transistor 30 independent of the state of transistor 32. The remaining transistor 38 is used for buffer purposes and particularly to permit transistors 30 and 32 to act as a current-mode flip-flop. Such flip-flop operation provides a minimal voltage swing at the collector electrodes of transistors 30 and 32.

Having identified the basic stages of the threshold detector of FIG. 4 and their functions, the detailed significance of the circuit design will now be shown in connection with the circuit operation comprising a switching, reset and recovery cycle. In the steady state condition prior to time $t_0$ the status of the transistor stages is as follows: transistors 20, 30 and 38 are conducting, transistor 32 is nonconducting. The conduction of transistor 38 yields an $E_{OUT}$ signal which is substantially at zero or ground potential. There is no reset signal present and the reset input is substantially at ground potential, thereby resulting in no current flow through diodes 28 or 36. At time $t_0$ a negative-going analog signal is applied to capacitor 24 at the circuit input. Transistor 20 is driven to nonconduction at time $t_S$ resulting in the turning off of transistor 30 since the emitter path of the latter transistor has been open-circuited. Transistor 32 is driven to conduction, and transistor 38, to nonconduction. $E_{OUT}$ now rises to substantially the amplitude of the + supply voltage. The transistors 30 and 32 which comprise the latch are now set independent of the state of transistor 20 and can only be changed by application of transistor 30 base input reset current in combination with the return to conduction of transistor 20. Consequently, the detector circuit state, once switched, is independent of analog signal conditions, such as the positive $dv/dt$, that would otherwise cause circuit recovery. It should be noted that when a reset control signal positive level is applied from the associated decision logic, which will be described in greater detail hereinafter, a positive base current for transistor 30 is not sufficient to change the overall circuit state alone because the conduction of transistor 30 is predominately controlled by the conduction state of transistor 20. Hence, in circuit recovery, reset current must be applied to both transistor 20 and 30, and transistor 20 must return to its steady state condition, that is, be conducting, before the transistors 30 and 32 latch circuit can transfer and the circuit output return to its corresponding steady state condition.

This latter feature is functionally useful to accomplish system demand reset in which the reset control signal duration is basically established by the signal analog conditions as reflected in the recovery time requirement of the threshold switch stage, transistor 20, itself. In practical system operation when analog signals are relatively close to switching threshold amplitude, resultant reset times are very short, whereas a large analog disturbance may result in reset and recovery period many tens of seconds long. If a worst case reset time were used, an extremely lengthy system "dead time" would result for normal signals. If a compromised fixed reset time is used, normal signal dead time would still be lengthier than necessary and unusually large signals could result in an inoperative system state.

In order to establish the significance of the full latch circuit of FIG. 4, it is necessary to consider the complete system implementation shown in FIG. 5 in conjunction with the application of an analog signal of the type represented in FIG. 3a. Threshold Detector 1 and Threshold Detector 2, reference numerals 42 and 44 respectively in FIG. 5 are each identical to the detector circuit of FIG. 4. It should be noted that in FIG. 5, as compared to the simple gating provided in FIG. 2, that the Decision Logic functional block 40 supplies the Reset Control signal to the pair of threshold detectors and that the threshold OR gate 46 not only indicates to logic the condition for processing initiation, ($Th_1 + Th_2$), but also indicates the condition for reset termination, ($\overline{Th_1} \cdot \overline{Th_2} = \overline{Th_1 + Th_2}$). The designations $Th_1$ and $Th_2$ represent the outputs from the respective detectors 42 and 44.

The system conditions of the configuration of FIG. 5 with respect to the applied analog signal of FIG. 3a are as follows. During steady state operation where the input signal angle $\theta$ is less than zero degrees, $Th_1$ and $Th_2$ are at zero level and the outputs from OR gate 46 and from AND gate 48 are also zero. There is no reset or decision logic activity during this time. A first threshold switching occurs when the input signal angle $\theta$ is greater than zero degrees but less than 180°. For an applied analog signal with a peak amplitude slightly greater than threshold switch minimum response level, threshold detector 44 will experience a negative-going input as a result of inverter 50 and will activate in the region of the signal 90° point. Such activation will produce a $Th_2$ output to OR gate 46 thereby initiating decision logic processing.

A second threshold switching occurs when the input signal angle is greater than 180° but less than 360°. At the signal 180° point, the threshold detector input conditions reverse and the threshold detector 44 experiences a $+dv/dt$ input while the detector 42 receives a $-dv/dt$ input. It should be noted that with respect to the threshold detector input stage, exemplified by transistor 20 of FIG. 4, the basic switch conditions correspond to FIG. 3b. However in the full latch circuit, the $Th_2$ (or $Th_1$) output cannot recover, that is, switch back to its steady state level, until the Reset Control command occurs.

The last statement emphasizes an important feature of the full latch circuit of FIG. 4 and its system organization, FIG. 5. Thus, although the input threshold switch (corresponding to transistor 20, FIG. 4) of threshold detector 44 will be returned to conduction by the analog signal conditions, the circuit latch effect provided by transistors 30 and 32 is not disturbed. As a consequence, when detector 42 ceases conduction in response to the $-dv/dt$ input signal condition, a $Th_1$ and $Th_2$ coincidence is guaranteed. Moreover, the effective peak detection (AND) threshold results at a signal amplitude almost identical to the logic initiation (OR) threshold. As compared with the basic system of FIG. 2, for equivalent peak detection amplitude performance, the system of FIG. 5 permits analog gain reduction simultaneously with a greater noise/drift analog tolerance. On the other hand, the system may be operated to achieve a two to three times sensitivity increase over that of FIG. 2 with no increase in analog gain and with no change in analog signal-to-noise characteristics.

The design of the Decision Logic 40 will depend upon particular operating requirements. Depending on the design, a Reset Control signal will be applied to both threshold detectors 42 and 44 at a time after logic initiation and/or a peak detection recognition. The Reset Control will establish in combination with the input signal, "turn-on" conditions for the detector input stages and the corresponding latch sections. As noted hereinbefore, the threshold detection output signals $Th_1$ and $Th_2$ will not return to steady state levels until the input stages and associated latch stages (e.g., transistors 20 and 30 of FIG. 4) are fully conducting, and by this means, the threshold detector outputs accurately define the point at which the Reset Control signal may be terminated.

FIG. 6 is a logic diagram which may be utilized as the Decision Logic block 40 of FIG. 5. It should be understood that the diagram of FIG. 6 has been included merely for purposes of example and that as mentioned hereinbefore, the decision logic may take numerous forms depending upon the application of the detector system. The particular form of decision logic to be employed rests with, and is well within the skill of, the logical designer. Accordingly, the present invention should not be considered limited by the particular design illustrated in FIG. 6.

It is the purpose of the decision logic of FIG. 6 to validate the characteristics of the input analog signal prior to generating an output indicative of an over-the-peak detection. For example, assuming prior knowledge of the frequency and waveform characteristics of the input signals expected to be received by the detector system of FIG. 5, the occurrence of an X (over-the-peak) signal from AND gate 48, at a time too soon after a Y (initiate logic) signal from OR gate 46, is treated as an invalid condition and no output "over-the-peak" signal is generated by the detector system. Such invalid condition may result from a variety of causes, for example, a spurious noise spike superimposed on the analog signal, or an analog signal having a higher frequency than that acceptable in a particular application — such conditions causing the decision logic to ignore the presence of the X signal. The flexibility of the decision logic design is further emphasized by the last-mentioned situation where readjustment of the decision logic parameters may be made to validate such high frequency input signals, if desired.

The processing of the X and Y signals by the decision logic of FIG. 6 proceeds as follows. In a steady-state condition, neither X nor Y signals are present (the levels on the X and Y terminals of FIG. 6 are "low"), the flip-flop 52 is in a reset condition as a result of the "high" voltage level applied to the R terminal thereof by inverter 54.

It will be assumed for purpose of explanation that the applied analog signal is that depicted in FIG. 3a, and that in accordance with the operation of the system of FIG. 5 as described hereinbefore, a Y signal is applied from OR gate 46 to the Y terminal of the decision logic. This Y signal is acted upon by the differentiating circuit 56 and the output thereof initiates a "check period" by triggering a delay multivibrator 58 to provide a predetermined $\Delta T_1$ pulse period. The inverted steady-state signal applied to the R terminal of flip-flop 52 is also removed at this time. During the $\Delta T_1$ period no valid X signal is anticipated. If an X signal from AND gate 48 does appear, it is coupled to the X terminal of the decision logic, and is applied in coincidence with the positive pulse output of delay multivibrator 58, to AND gate 60. The output from AND gate 60 is coupled through OR gate 62 to the S (Set) terminal of flip-flop 52. The setting of flip-flop 52 causes a Reset Control signal to be generated by the flip-flop, which signal is applied in common to the respective reset terminals of the threshold detectors 42 and 44. As noted previously, Reset Control current must be provided for transistors 20 and 30 (FIG. 4) and transistor 20 must return to its steady-state conducting condition in response to the input analog signal, before the latch (transistors 30 and 32) can transfer and, the threshold detector output return to its steady-state condition. Thus the duration of the Reset Control signal is a function of the analog signal and the recovery time for the input detector stage. The Reset Control signal is also applied to a second delay multivibrator 64 to inhibit its operation. Differentiating circuit 66 differentiates the output negative pulse from delay multivibrator 58 and normally triggers delay multivibrator 64. However in the example under consideration, where an invalid X signal occurred during $\Delta T_1$, the presence of a Reset Control signal prevents the differentiated output of circuit 66 from triggering delay multivibrator 64 and initiating a $\Delta T_2$ pulse period.

In a second situation, it will be assumed that a Y initiate logic signal has occurred and that no X signal appeared during the first time period $\Delta T_1$. A negative pulse from delay multivibrator 58 is applied to differentiating circuit 66 which generates a positive trigger pulse corresponding in time to the trailing edge of said negative pulse. This trigger pulse is applied to delay multivibrator 64 and serves to initiate a second pulse period $\Delta T_2$. An X signal occurring during the $\Delta T_2$ period is regarded as valid.

It will be assumed that an X signal from AND gate 48 is applied to the X terminal of the Decision Logic during time $\Delta T_2$. The X signal is applied to AND gate 68 in coincidence with a positive signal from delay multivibrator 64. An output signal from AND gate 68 represents an OUTPUT from the detector system indicating that an over-the-peak condition has occurred. Additionally, the AND gate 68 output effects a setting of flip-flop 52, which in turn results in the Reset Control signal being applied to the reset terminals of threshold detectors 42 and 44, and to delay multivibrator 64, to terminate the pulse period $\Delta T_2$.

If in a third situation, no X signal occurs during the $\Delta T_2$ time, the differentiating circuit 70 which is operatively connected to receive the negative pulse output from delay multivibrator 64 generates a trigger pulse corresponding in time to the trailing edge of said negative pulse. The trigger pulse from differentiating circuit 70 passes through OR gate 62 and sets flip-flop 52, which generates the Reset Control signal. The Reset Control signal is applied to threshold detectors 42 and 44 and is present until the analog signal input conditions are such that no Y signals exist. Stated another way, Reset Control is present until the input detector stages have resumed their steady state conduction and the $Th_1$ and $Th_2$ outputs of the detectors are both zero. With a return to steady state conditions, inverter 54 of the decision logic returns flip-flop 52 to the reset state, thereby terminating the Reset Control signal.

The operation of the detection systems described hereinbefore assumed that a positive-going signal, as in FIG. 3a, was applied to the $e_{in}$ input terminals in FIGS. 2 and 5. It is obvious that the circuit action for a negative-going signal applied to the last mentioned terminals is identical except that the behavior of the input threshold switch stages in each case is interchanged.

It should be apparent from the foregoing description of the invention and its mode of operation that there are provided improved over-the-peak signal detection systems. The systems perform their detection function with a degree of accuracy suitable for a wide range of applications. The circuit configurations employed utilize a minimum number of components and provide very low current operation of less than 20 microamperes.

It should be understood that changes and modifications of the arrangements described herein may be required to fit particular operating requirements. These changes and modifications, in so far as they are not departures from the true scope of the present invention, are intended to be covered by the claims appended hereto.

What is claimed is:

1. An over-the-peak signal detection system for receiving an input push-pull electrical signal comprising a pair of threshold detectors each having an input and an output terminal, the in-phase and phase-inverted form of said input signal being applied respectively to the input terminals of said threshold detectors, each of said detectors including a current amplifying stage, a capacitor connecting said input terminal of each detector to its associated current amplifying stage, each of said stages being normally in a conducting state in the absence of said input electrical signal, the degree of conduction of the current amplifying stages being a function of the respective instantaneous amplitudes of said in-phase and phase-inverted forms of said electrical signal and the electrical charges on the capacitors associated therewith, the in-phase form of said input signal initially causing increased conduction in a first of said stages and the charging of its associated capacitor, the phase-inverted form of said input signal concurrently causing the second of said stages to cease conduction, OR and AND gating means, said output terminal of each of said threshold detectors being coupled to both said OR and AND gating means, said cessation of conduction in the second of said stages resulting in the generation of a signal on the output terminal of the associated detector and the passing of said last mentioned signal by said OR gating means to initiate logic processing of the input electrical signal, the passage of said input electrical signal through its maximum absolute amplitude resulting in the return of the first of said stages to its normal state of conduction and the subsequent discharge of its associated capacitor, whereby said last-mentioned stage is driven to a nonconducting state, both said stages being nonconductive at this time, the coincident cessation of conduction in both said stages resulting in the generation of signals on the output terminals of both detectors, thereby allowing said AND gating means to provide an output signal indicative of the occurrence of an over-the-peak condition in the input electrical signal, and decision logic means operatively connected to said AND and OR gating means for processing the outputs therefrom and for generating a system output signal indicative of a valid detection.

2. A signal detection system as defined in claim 1 further characterized in that each of said current amplifying stages has an input, an output and a control electrode, each of said capacitors being connected between a detector input terminal and the control electrode of the amplifying device associated with that detector, the input electrodes of said stages being connected in common to a source of reference potential, first and second impedance means for coupling the respective output electrodes of said stages to a source of supply potential, third and fourth impedance means for coupling the respective control electrodes of said stages to said source of supply potential, the output terminals of said pair of threshold detectors corresponding electrically to the respective output electrodes of said current amplifying stages.

3. A signal detection system as defined in claim 2 wherein said current amplifying stages are transistors and said input, output and control electrodes are respectively emitter, collector and base electrodes.

4. An over-the-peak signal detection system for receiving an input push-pull electrical signal comprising a pair of threshold detectors each having an input and an output terminal, the in-phase and phase-inverted form of said input signal being applied respectively to the input terminals of said threshold detectors, each of said detectors including an input current amplifying stage and a latch circuit capable of assuming either of two stable conditions, means coupling each of said input current amplifying stages to a latch circuit, reset control means coupled to each of said threshold detectors, a capacitor connecting said input terminal of each detector to its associated current amplifying stage, each of said input stages being normally in a conducting state and each latch circuit being in a first of said stable conditions in the absence of said electrical signal, the degree of conduction of the input current amplifying stages being a function of the respective instantaneous amplitudes of said in-phase and phase-inverted forms of said electrical signal and the electrical charges on the capacitors associated therewith, the in-phase form of said input signal initially causing increased conduction in a first of said input stages and the charging of its associated capacitor, the phase-inverted form of said input signal concurrently causing the second of said input stages to cease conduction, the latch circuit associated with the second of said input stages being switched to the second of said stable conditions in response to the cessation of conduction of said last-mentioned stage, the passage of said input electrical signal through its maximum absolute amplitude resulting in the return of the first of said input stages to its normal state of conduction and the subsequent discharge of its associated capacitor, whereby said last-mentioned stage is driven to a nonconducting state, the latch circuit associated with the first of said input stages being switched to the second of said stable conditions in response to the cessation of conduction of said last-mentioned stage, both said latch circuits being in the same stable condition at this time, the signal levels appearing on the output terminals of said detectors with both latch circuits in the second of said stable conditions being indicative of said over-the-peak condition of said input signal, the subsequent return to conduction of said second of said input stages in response to the input electrical signal applied thereto being ineffective in the absence of the energization of said reset control means, to switch the associated latch circuit to its original first stable condition and to cause a change in said signal levels on said detector output terminals, gate means coupled to said detector output terminals and decision logic means operatively connected to said gate means for processing the outputs therefrom and for generating a system output signal indicative of a valid detection.

5. A signal detection system as defined in claim 4 further characterized in that each of said input current amplifying stages has an input, an output and a control electrode, each of said capacitors being connected between a detector input terminal and the control electrode of the input amplifying stage associated with that detector, impedance means for coupling said input stage control electrode to a source of supply potential, each of said latch circuits comprising first and second current amplifying devices, each of said latch circuit devices having an input, an output and a control electrode, said latch circuit devices being connected in a cross-coupled flip-flop configuration wherein the control electrode of said first device is coupled to the output electrode of said second device and the control electrode of said second device is coupled to the output electrode of said first device, impedance means coupling respectively the output electrodes of said latch circuit devices to said source of supply potential, the output electrode of said input stage being connected to the input electrode of said first latch circuit device, the respective input electrodes of said input stage and said second latch circuit device being connected to a source of reference potential, said reset control means comprising for each of said threshold detectors a reset terminal and a pair of current paths, each path including in series impedance means and a diode, said circuit paths connecting the respective control electrodes of said input stage and said first latch circuit device in common to said reset terminal.

6. A signal detection system as defined in claim 5 wherein each of said threshold detectors includes an output buffer stage, said output buffer stage comprising a current amplifying device having an input, an output and a control electrode, impedance means coupling the control electrode of said output buffer stage device to the output electrode of said second latch circuit device, impedance means coupling the output electrode of said output buffer stage device to said source of supply potential, said input electrode of said output buffer stage device being connected to said source of reference potential, said output terminal of each of said threshold detectors corresponding electrically to the output electrode of said output buffer stage device.

7. A signal detection system as defined in claim 6 wherein said current amplifying stages and devices are transistors of NPN conductivity type, and said input, output and control electrodes are respectively emitter, collector and base electrodes.

8. A signal detection system as defined in claim 4 wherein said gate means comprise OR and AND gating means, said decision logic means being coupled to said gating means, the output terminal of each of said threshold detectors being coupled to both said OR and AND gating means, the switching of the latch circuit coupled to the second of said input stages to its second stable condition resulting in the generation of a predetermined signal level on the output terminal of the associated detector and the passing of "initiate logic" and "reset-stop" signals by said OR gating means to said decision logic means, the switching of the latch circuit coupled to the first of said input stages to its second stable condition resulting in the generation of said predetermined signal level on the output terminal of the associated detector, the coincidence of said signal levels on said detector output terminals allowing said AND gating means to provide an "over-the-peak" signal to said decision logic means, said decision logic means processing said signals from said OR and AND gating means for determining the validity of said "over-the-peak" signal based upon known characteristics of the input electrical signal, said decision logic means generating a system output signal indicative of a valid detection and providing for the energization of said reset control means.

9. A signal detection system as defined in claim 8 wherein said decision logic means comprises first and second input terminals for receiving respectively signals from said OR and AND gating means and a system output terminal, a flip-flop circuit having set and reset terminals, inverter means coupling said first input terminal of said decision logic means to the reset terminal of said flip-flop, a first differentiating circuit coupled to said first decision logic input terminal, a first delay multivibrator having an input terminal coupled to said first differentiating circuit and a pair of output terminals for providing pulse outputs of opposite polarity and predetermined duration in response to a trigger pulse from said first differentiating circuit, first and second AND gates each having a pair of input terminals and an output terminal, an OR gate having first, second and third input terminals and an output terminal, the output terminal of said OR gate being coupled to the set terminal of said flip-flop, means coupling said second decision logic input terminal and one of said output terminals of said first delay multivibrator to the respective input terminals of said first AND gate, the output terminal of said first AND gate being coupled to said first input terminal of said OR gate, a second differentiating circuit coupled to the other output terminal of said first delay multivibrator, a second delay multivibrator having an input terminal coupled to said second differentiating circuit and a pair of output terminals for providing pulse outputs of opposite polarity and predetermined duration in response to a trigger pulse from said second differentiating circuit, means coupling said second decision logic input terminal and one of said output terminals of said second delay multivibrator to the respective input terminals of said second AND gate, the output terminal of said second AND gate corresponding electrically to said system output terminal and being coupled to said second input terminal of said OR gate, a third differentiating circuit coupled to the other output terminal of said second delay multivibrator, the output of said third differentiating circuit being coupled to said third input terminal of said OR gate, the setting of said flip-flop in response to an output signal from said OR gate causing said flip-flop to generate a reset control pulse, said reset pulse being applied to said second delay multivibrator to inhibit the operation thereof and to both said threshold detectors.

* * * * *